Figure 6:
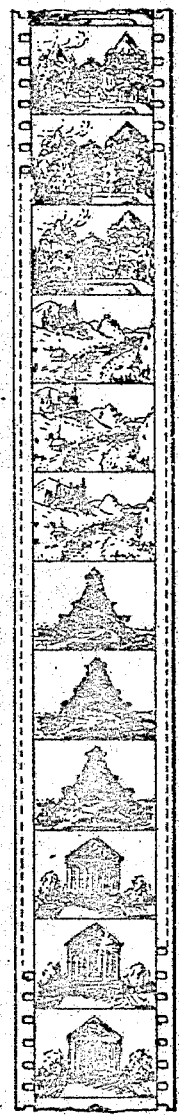
Figure 6A:
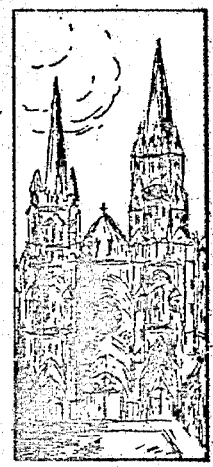
Figure 6B:
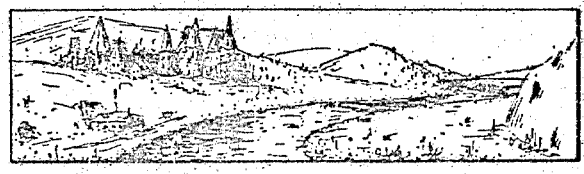
Figure 6C:
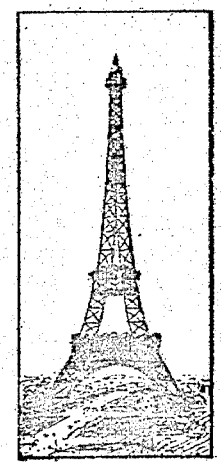
Figure 6D:
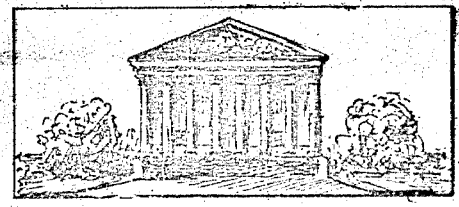

Oct. 27, 1931.                H. CHRETIEN                1,829,634
         TAKING AND PROJECTION OF MOTION PICTURES AND FILMS THEREFOR
                    Filed Jan. 28, 1929        3 Sheets-Sheet 1
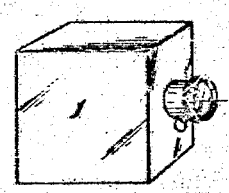
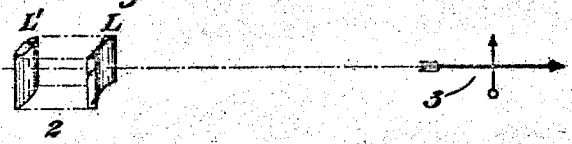
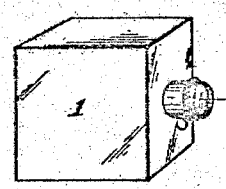
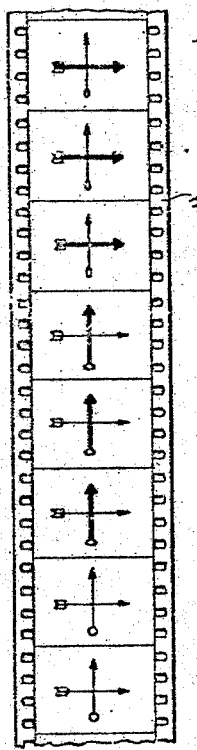
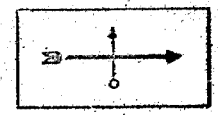
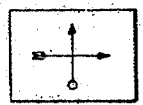
INVENTOR
Henri Chretien,
BY
ATTORNEYS Oct. 27, 1931.   H. CHRETIEN   1,829,634
TAKING AND PROJECTION OF MOTION PICTURES AND FILMS THEREFOR
Filed Jan. 28, 1929   3 Sheets-Sheet 2

INVENTOR
*Henri Chretien*
BY *Eyre Scott & Keel*
ATTORNEYS

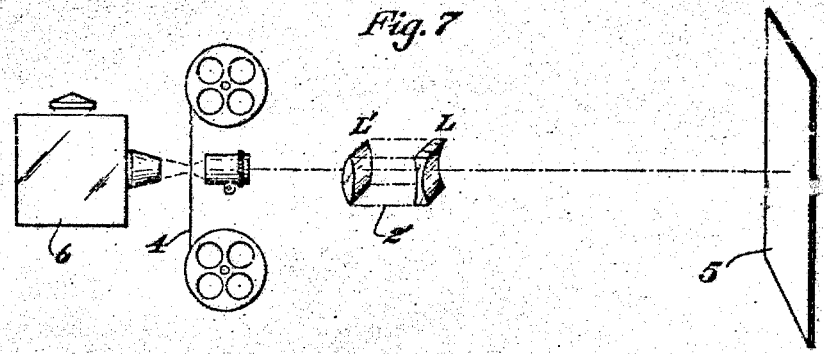
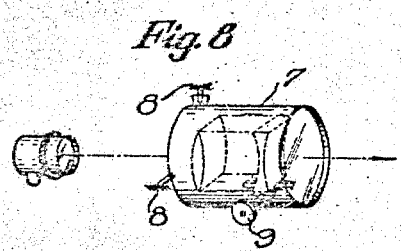
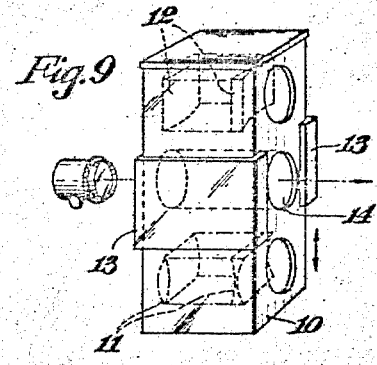
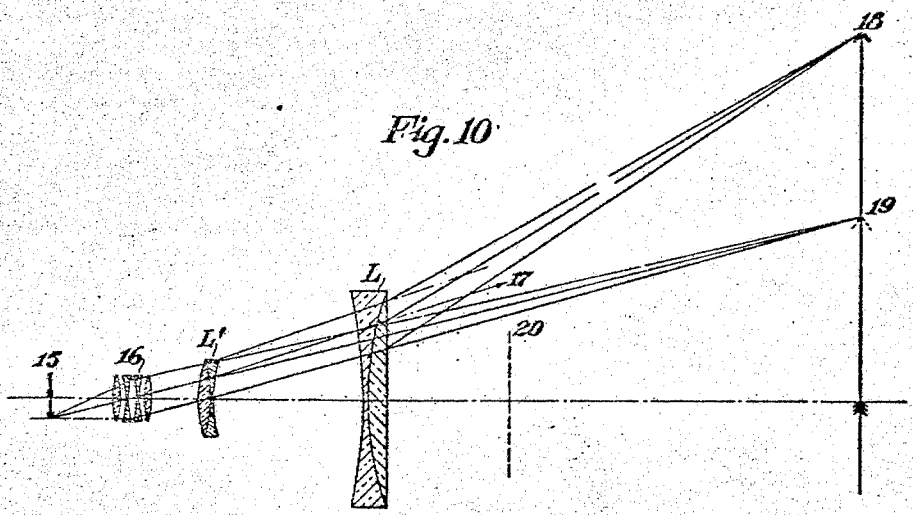

Patented Oct. 27, 1931

1,829,634

UNITED STATES PATENT OFFICE

HENRI CHRETIEN, OF ST. CLOUD, FRANCE

TAKING AND PROJECTION OF MOTION PICTURES AND FILMS THEREFOR

Application filed January 28, 1929, Serial No. 335,564, and in France April 29, 1927.

This invention relates to the taking and projection of motion pictures.

In the motion picture art the standardization of the films and the taking and projecting equipment has put serious limitations upon the relative dimensions of the frame of the picture.

In the practice of my invention I have in mind the artistic and dramatic possibilities which result from the introduction into the body of a motion picture of scenes which depart from the standard proportions. In neither the photographic or painting and sketching art has it been possible to limit artistic progress by enforcing the employment of a frame of fixed proportions. The relative dimensions of the picture are necessarily chosen so as to most advantageously present the subject matter and it is well known how tremendous may be the detrimental effect upon the composition of a picture of the inclusion of too much or too little of the subject and/or its surroundings in one direction or another. In a motion picture the subject matter and the proper frame in which it should most properly be presented are necessarily changing as different scenes follow one another and it is desirable that the possibility should exist for conforming to the requirements of the scene in this respect. My invention may introduce into a motion picture groups of pictures, which at one moment have a form extended in one direction and at another moment may have a form extended in another direction so as to conform to the best artistic and dramatic composition of the picture.

I have also in mind the fact that the development of the motion picture industry has resulted in greatly changing the size and character of the theatres in which pictures are shown and that many considerations influence the size and proportions of the stages and consequently of the curtains in such theatres. My invention permits the fuller employment of the screen space available by extending the picture in one direction or another depending on the particular architectural features which do or may dominate.

In one aspect my invention resides in being able to vary at will the proportions and extensions of the pictures taken and projected notwithstanding the employment of standard equipment and thereby obtain a series of pictures or groups of pictures whose proportions and extensions in any direction accord with the best artistic and dramatic sense. For example, by my invention I am able to extend the field of view taken and projected at will while preserving the normal dimensions of the films, and without reducing the scale of object taken or projected, without sacrificing any portion of their surface and without resorting to the multiplication of the apparatus. It renders possible the change of the shape of the frame of the views projected by means of a single apparatus such as are actually in use, both for photographing the views and for projection, whether lantern slides or motion pictures.

In the practice of my invention I extend optically the field of view which may be imaged on a given area of a sensitized surface, by compressing the images in one single direction, either in height, or in width, or in any inclined direction selected, this result being obtained by disposing in front of the ordinary photographing objective used to form the image any suitable optical system for this purpose but preferably a system including a local anamorphoser suitably oriented about the optical axis of the objective. I then restore or project these images through an ordinary projection lens such as are in common use and an optical combination similar to that which has served for obtaining the impressed image and similarly oriented, which has the result of re-establishing the images in their exact enlarged proportions on a screen of suitable dimensions and arrangement.

As applied to the making of a film which may be run through standard projecting apparatus, my invention in one aspect resides in a negative or positive film embodying a series of views to be projected, some of which views may be optically compressed in one direction and some in another, while some of the views may be normal in all directions without optical distortion or compression. Such a film may be a motion picture film of standard dimensions. It may be run through a standard projection apparatus associated with the local anamorphoser to obtain the correct projection and restoration or extension of the field of view of the pictures which are compressed, the anamorphoser being operative when the film with distorted pictures is passing through and out of operation when a film with ordinary pictures is passing through.

Any suitable photographic apparatus or camera such as is customarily employed for taking pictures may be used in conjunction with the local anamorphoser to produce the compressed images thereon, and the restoring and projection of these images for re-establishing them in their exact and proper proportions on the screen, may be done with any ordinary projection apparatus used in conjunction with the local anamorphoser, and I have found that good results and particularly good definition is obtained by the use of a local anamorphoser, as above indicated, when properly adjusted.

The optical combination forming this local anamorphoser is composed of two or more systems of cylindrical lenses arranged one behind the other in such a manner that their axial planes are in coincidence. For the purpose of reducing the chromatic and geometric aberrations of the combination, each partial system may be constituted by the association of several simple or cemented cylindrical lenses, calculated according to known principles similar to those which are applied to the optical systems constituted by surfaces of revolution about the principal axis of the system.

The several partial systems into which the combination may be decomposed are adjustable, as to their mutual distances, according to the different distances of the subject from the photographic apparatus so that the anamorphosed image of the subject, seem through the anamorphoser, is formed at the same distance, a condition which prevents the introduction of astigmatism in the definitive image—(on the film).

The compression which the anamorphorser produces in its active plane is given a predetermined value, equal to the inverse of the coefficient by which it is desired to multiply the extension of the field in this direction; for example if the field is to be multiplied by 2½ the compression is equal to 4/10.

The anamorphoser is adapted to be oriented by simple rotation about its optical axis and that of the objective before which it is placed. According to this orientation views extended either in width, in height, or even obliquely may be compressed for imaging on the film.

Levels of sufficient number, suitably secured to the periphery of the anamorphoser may facilitate its rapid and exact orientation in a selected plane or its orientation may be conveniently fixed by mechanical stops of suitable nature and arrangement.

The projection screen will evidently have the necessary dimensions in height and in width so as to receive the projections of greater sizes which are obtained by the anamorphoser.

However, as it may be disagreeable during projections of normal dimensions to see a screen which is not filled by the image, it may be advisable to mask the areas which are not used by means of suitable curtains which separate in pairs so as to effect unmasking of the useful areas only at opportune times.

Further objects and advantages of the invention will appear from the following description taken in connection with the drawings wherein:

Fig. 1 is a diagrammatic illustration of the photographic apparatus for taking the picture whose image is compressed in a horizontal direction, Fig. 2 is a view indicating diagrammatically the image of the object made by the anamorphoser, lying in the same plane as the object, Figs. 3 and 4 correspond to Figs. 1 and 2 for compressing the image in the vertical direction, Fig. 5 is a view diagrammatically indicating a negative or film embodying the invention, Figs. 5a, 5b, and 5c indicate diagrammatically the images of Fig. 5 as projected upon a screen, Fig. 6 is a view similar to Fig. 5 illustrating actual views which are compressed in certain directions, the part of the film showing normal views and views compressed in other than the horizontal or vertical direction being omitted for convenience, Figs. 6a, 6b, 6c and 6d are views of the compressed images of Fig. 6 as restored and projected upon the screen, Fig. 7 is a view of an ordinary projection apparatus adapted to project the images of the films of Figs. 5 and 6, Fig. 8 is a diagrammatic view of a mounting for facilitating the rotation of the local anamorphoser from one angle of orientation to another and a device for focusing the anamorphoser by varying the distance of its components from each other.

Fig. 9 is a diagrammatic perspective view of means whereby the local anamorphoser may be readily inserted in the optical system in any manner desired, and Fig. 10 is a diagrammatic cross section of the optical system.

Referring to the drawings, I have indicated in Fig. 1 an ordinary camera and more particularly a motion picture camera of any suitable standard construction embodying the usual photographic objective and at 2 I have indicated diagrammatically the local anamorphoser which I use in combination with the camera 1 to take a picture of an object such, for example, as that indicated by the crossed arrows at 3. The field of the object 3 in the horizontal direction is assumed to be larger than can properly be taken by the camera 1 in the horizontal direction, and the local anamorphoser 2 is adapted to compress the view horizontally so as to get the whole view thereof, though distorted, on the negative or film. The image of the object thus produced by the anamorphoser is indicated in Fig. 2, the heavy lined horizontal arrow indicating the compression of the elongated heavy lined arrow shown in Fig. 1. The camera objective then in turn forms an image in the usual manner on the film of the Fig. 2, Fig. 3 corresponds to Fig. 1 but with the local anamorphoser 2 rotated 90° to compress the image of the object in the vertical direction, the image thus produced by the anamorphoser being indicated in Fig. 4, and the heavy lined vertical arrow of Fig. 4 indicating by its shortening the compression and distortion of the view in the vertical direction.

As hereinafter described the local anamorphoser 2 is preferably mounted so that it can be readily rotated from one position to another to compress the views in the desired direction, or to be removed from the operative position altogether to provide for taking or projection of normal views which are not compressed in any direction. The special adjustments and construction of the local anamorphoser 2 necessary to obtain good definition of objects at varying distances from the camera will be described more in detail below.

In Fig. 5 I have indicated a film embodying a series of images to be projected on one part of the film, for example, including images corresponding to Fig. 2, another part corresponding to Fig. 4 and still another part embodying images which are normal in all directions. In Fig. 5a I have indicated a view of a compressed image of Fig. 2 as projected and restored upon the screen and in Fig. 5b I have indicated a projected and restored view of the image of Fig. 4. In Fig. 5c I have indicated the projection of the normal uncompressed or undistorted view. The film 4 of Fig. 5 may, of course, embody images or pictures which are compressed or distorted in other directions than those indicated, and of course it may embody a greater or less number of views compressed in any one direction. The film may be of standard size for running through the standard projection equipment or it may be 16 mm. Cinefilm or any other size desired and all the useable surface of the film is utilized or may be utilized if desired in the making of the pictures whether compressed in one direction or another or whether compressed or distorted at all.

I have indicated above the general principles of the invention. I have not attempted to indicate the limits of compression and enlargement although it is entirely practical to compress and enlarge in any direction by the ratio of as much as three to one.

In Fig. 6 I have indicated a film corresponding to Fig. 5 embodying actual pictures some compressed in one direction and some in another direction while in Figs. 6a, 6b, 6c, and 6d I have indicated the enlargement and restoration and projection of these compressed views upon the screen.

In Fig. 7 I have indicated a projection equipment for projecting the pictures of the films of Figs. 5 and 6 upon a screen 5. At 6 there is indicated an ordinary standard projection apparatus of any suitable character including a source of light, condensing lenses, advancing and shutter mechanisms, etc., together with reels for receiving the film 4 which is run therethrough. A local anamorphoser 2' is employed similar to the local anamorphoser utilized in the taking of the pictures.

In Fig. 8 I have indicated a support or sleeve for holding the local anamorphoser and permitting its rotation about its axis to obtain the proper setting for compressing the enlarged picture in the desired direction. The local anamorphoser is mounted in sleeve 7 and is supplied with stops 8 to enable it to be quickly arrested in any of several desired orientations. The figure also indicates a device 9 for adjusting the anamorphoser independently of the projection objective.

Fig. 9 indicates a frame 10 comprising two local anamorphoser units 11 and 12 disposed at opposite ends of the frame which is slideable in the guides 13 to position either of the units 11 or 12 in the axis of the optical system. These units 11 and 12 are disposed at right angles to each other so as to be able to very quickly adjust for enlargement in one direction or the other. The frame is provided with an opening 14 through its central part permitting the taking or projection of pictures in the normal way without distortion by simply sliding the frame to its intermediate position with the local anamorphoser units 11 and 12 disposed on opposite sides of the optical axis of the apparatus in conjunction with which it is used.

In Figs. 1, 3 and 7 I have diagrammatically indicated the local anamorphoser 2 as including two systems of cylindrical lenses L and L' each composed of a single thin lens. They are separated at such a distance from each other that the image formed by the combination lies in the same frontal plane as the object. Their focal lengths are further so chosen as to give the desired compression to the image.

In Fig. 10 is illustrated diagrammatically a cross-section of the anamorphoser system assumed to be reduced to two lens systems L and L'. Between the focal lengths of these lenses and the distance which separates them such ratios are laid down as enable the following conditions to be satisfied:

1. The image of the frontal object plane produced by the plane sheets of luminous rays which are propagated in planes at right angles to the common plane of the axes of the cylindrical lens should register with the object plane itself. In other words this plane should be one of the two planes of Bravais of the combination viz.: one of the double planes of the homographic correspondence. The plane containing the virtual image produced by the anamorphoser of a plane object lying in a frontal plane should coincide with this object plane itself. This plane is indicated at 18, 19 in Fig. 10.

2. The enlargement of this image should have a given value. For example in the Figures 2, 4 and 5, and 10, it was drawn to be 1/2.

If the object plane is at infinity the anamorphoser is anastigmatic when the distance between its two component systems is equal to the sum of their algebraic focal lengths. This distance apart must be decreased if the object is at a lesser distance than infinity.

Referring to Fig. 10, 16 is an ordinary photographic objective. It might also be a projection lens or might be replaced by a telephoto objective. L' is a positive cylindrical lens composed of two cylindrical elements, cemented or uncemented, with the negative element in front or behind and both elements having their axial planes perpendicular to the plane of the paper and passing through the axis of the system. L is a negative cylindrical lens composed of two elements, cemented or uncemented, the positive one of which is either in front or behind. Both have their axial planes perpendicular to the plane of the paper and passing through the axis of the system.

The focal lengths of the lenses L' and L and their distance from each other are so chosen that the second focal plane of L and the first focal plane of L' coincide in 20 when the anamorphoser is to be anastigmatic for an object at infinity. The focal lengths are further so chosen that the angle of inclination to the axis of rays entering the system at L is twice that of the rays leaving the system at L'. The compression is 1/2. It might practically have been chosen to have any other value between 1 and 1/3.

My invention is not limited to having the optical compression take place at the time of first imaging and fixing the object upon a film. It is possible to make use of film of other than standard dimensions having thereon undistorted images whose dimensions are not proportional to the standard proportions of 4 to 3 and to compress such images by printing them through the use of an anamorphoser so as to compress the one dimension or the other to conform to the 4:3 ratio of standard motion picture film.

In the preparation of the definitive image or scene upon the film it is not necessary that the whole of the scene thus fixed on the film should be fixed upon it at one time or from views taken at one time. The scene upon the film may be composed of portions taken at different times and even places and the whole separately or simultaneously compressed so as to build up a laterally or vertically extended composite scene. This may be done at some stage in the printing of pictures from several standard negatives. It is understood that in Fig. 5 the pictures may be of such composite character.

This application is a continuation in part of my application filed January 9th, 1928, Serial Number 245,558.

I claim:

1. A motion picture film having thereon a plurality of series of images, each image being of the same area, the images of one or more of said series all having proportions normal with those of the object and the images of another or others of said series all being optically compressed in one given direction whereby by projecting the film on the screen with ordinary enlargement of the images of some of the series and with suitable differential enlargement of images of the other series, pictures in natural proportions but of different sizes and shapes best suited to the nature of the view may be made to appear upon the screen.

2. A projection picture film having formed on the portion thereof available for picture recording and reproduction a series of images of standard uniform dimensions and proportions, but certain of said images being optically compressed in one dimension to thereby obtain in a given available space views which are considerably extended in that dimension.

3. A projection picture film including thereon a series of pictures of uniform dimensions and proportions some of which are normal and some of which are optically compressed, certain of the latter being compressed in one dimension and certain ones in another, so as to obtain both normal and extended views from the same film when projected upon a screen.

4. A projection picture film including a series of pictures thereon of uniform dimensions and proportions which are optically compressed, some in one dimension and some in another, so as to obtain when projected and restored views which are considerably extended but only in the one dimension or the other.

In testimony, I have signed my name to this specification.

HENRI CHRETIEN.